Nov. 9, 1937.   B. A. LA GRASSE   2,098,296
PLANETARIUM
Filed Jan. 2, 1937   3 Sheets-Sheet 1
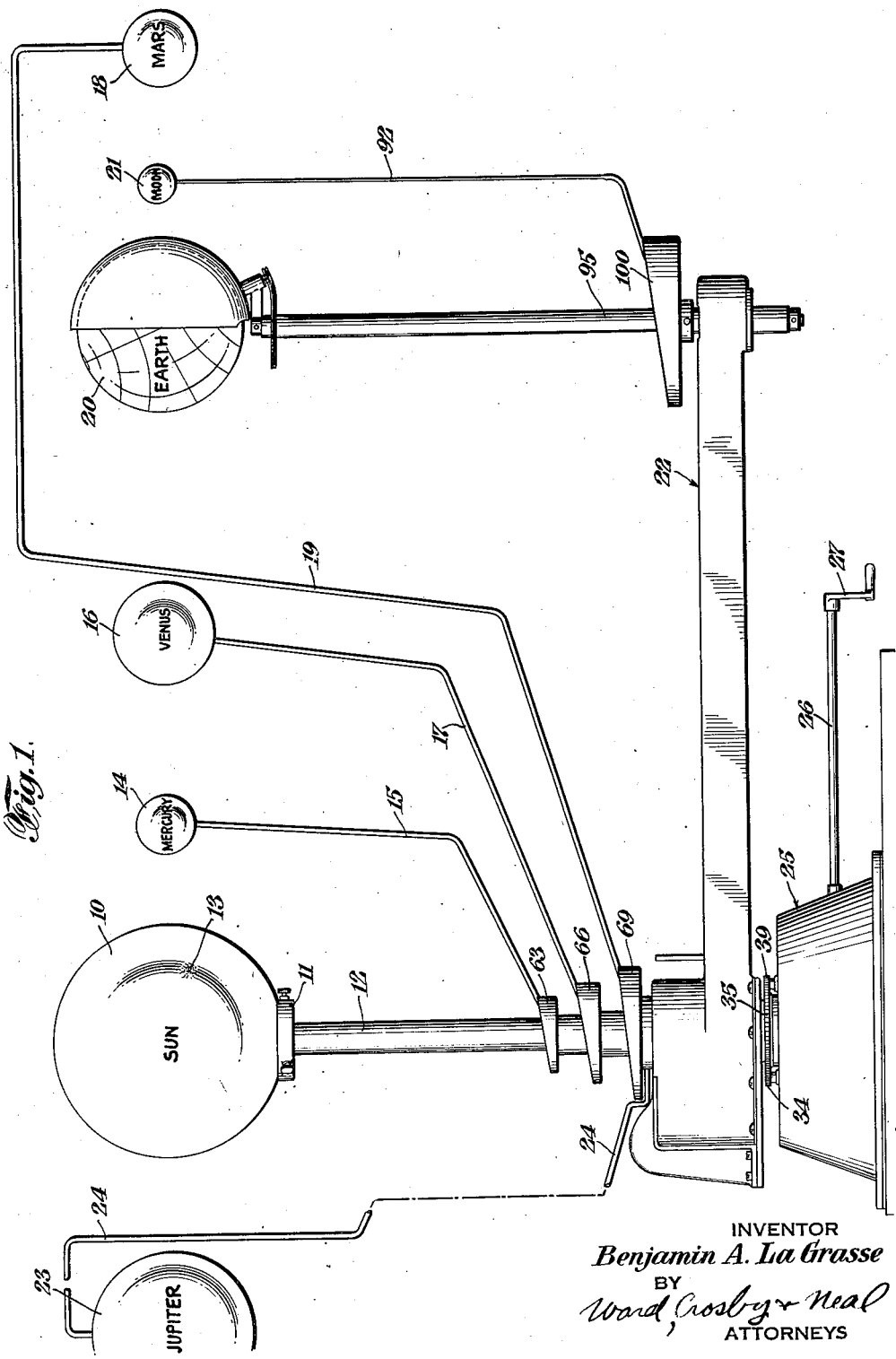
INVENTOR
*Benjamin A. La Grasse*
BY
*Ward, Crosby & Neal*
ATTORNEYS

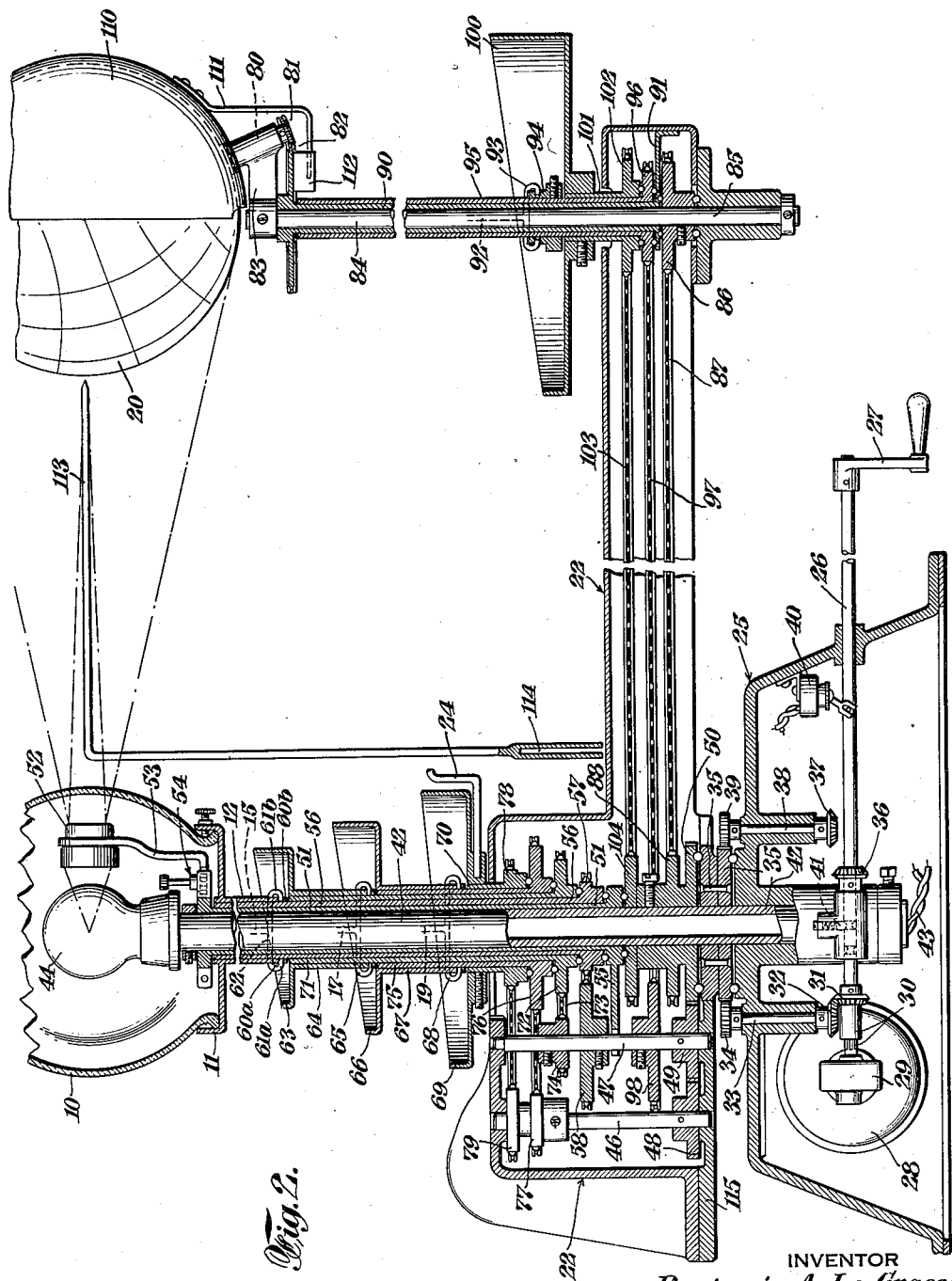

Nov. 9, 1937.  B. A. LA GRASSE  2,098,296
PLANETARIUM
Filed Jan. 2, 1937  3 Sheets-Sheet 3
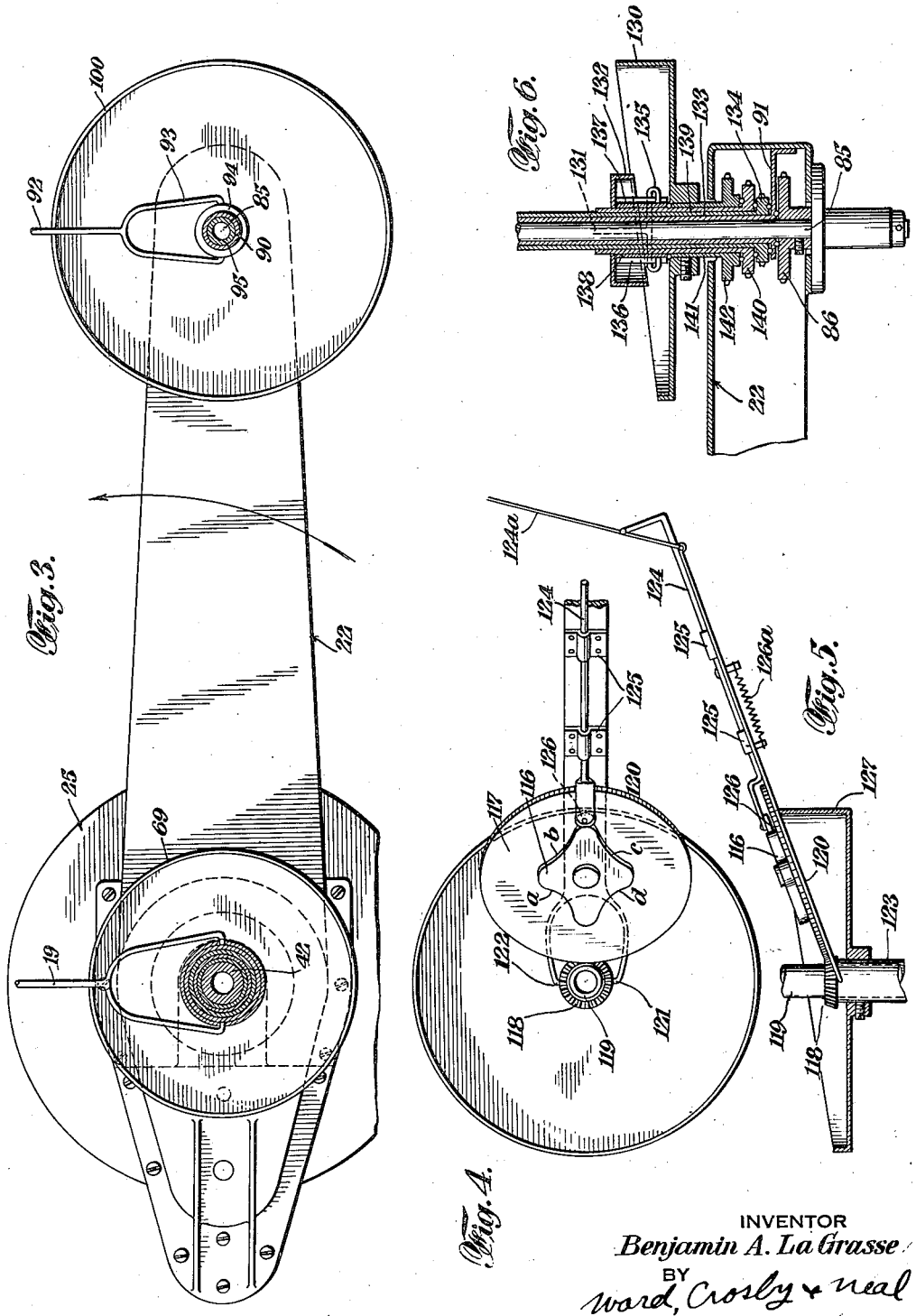
INVENTOR
Benjamin A. La Grasse
BY
Ward, Crosby & Neal
ATTORNEYS Patented Nov. 9, 1937

2,098,296

UNITED STATES PATENT OFFICE 2,098,296

PLANETARIUM

Benjamin A. La Grasse, Brooklyn, N. Y.

Application January 2, 1937, Serial No. 118,737

11 Claims. (Cl. 35—45)

This invention relates to a planetarium and more particularly to a type of planetarium for simultaneously demonstrating or representing the positions and various relative motions of the principal heavenly bodies of the solar system.

The objects of the invention include the provision of apparatus for demonstrating in greater detail than has been possible with prior apparatus for the purpose, the various complicated motions of the planets and other bodies in respect to the sun.

A further object of the invention is to provide a more compact, simplified and improved planetarium of the type above indicated and particularly adapted for class room demonstrations and the like. Also according to my invention, the various operating parts and supporting mechanism may be so constructed, arranged and grouped as to avoid detracting from the realistic appearance of the moving spheres representing the planets, etc.

Various further and more specific objects, features and advantages will clearly appear from the detailed description given below, taken in connection with the accompanying drawings which form a part of this specification and illustrate, merely by way of example, various embodiments of the apparatus of the invention.

The invention consists in such novel features, arrangements and combinations of parts as may be shown and described in connection with the apparatus herein disclosed.

In the drawings, Fig. 1 is a side elevational view of a preferred form of planetarium embodying various features of my invention;

Fig. 2 is an enlarged vertical sectional view of the device of Fig. 1 and with certain parts broken away;

Fig. 3 is a horizontal sectional view taken substantially along the line 3—3 as indicated in Fig. 2;

Fig. 4 is a plan view with parts broken away, of an alternative construction of one portion of the device of Fig. 2;

Fig. 5 is a vertical sectional view of the mechanism of Fig. 4; and

Fig. 6 is a vertical sectional view of another alternative embodiment of a portion of the device of Fig. 2.

Referring to Fig. 1, an illuminated globe representing the sun is indicated at 10 and attached by a clamp 11 to a shaft 12, which is rotatable on its axis together with the globe 10, to demonstrate the rotation of the sun upon its axis. The surface of the globe 10 may be colored to suitably represent the sun as viewed through a telescope. For example, at some points the surface may be so painted as to indicate sun spots as at 13, and remaining areas may be suitably decorated to give the slightly mottled appearance discernible on the surface of the sun when viewed through a suitable telescope.

A sphere 14 representing the planet Mercury may be mounted upon a small wire support 15. By means of mechanism hereinafter explained, the support 15 is arranged to carry "Mercury" along a variable path corresponding in general to the orbit of Mercury around the sun in nature. Similarly, another sphere 16 representing Venus is supported by a wire 17. A sphere 18 representing Mars is supported by a wire 19, the latter support being so shaped that "Mars" may follow its orbit around the "Sun" without interference with the orbit of the sphere 20, representing the Earth. The "Earth" together with a sphere 21 representing the Moon, are both supported from a rotatable housing structure 22 which carries suitable mechanism hereinafter described for demonstrating the motion of the Earth and of the Moon in greater detail than in the case of the other planets. A sphere 23 is provided to represent Jupiter and is mounted on a wire support 24 so shaped as to carry "Jupiter" along an orbit outside that of "Mars", but without interfering with the orbits of the "Earth", the "Moon" and "Mars".

If desired, additional spheres representing the remaining planets, asteroids and some of the comets, might also be supported and operated by equipment similar to that about to be described for the various planets illustrated in Fig. 1.

It will be understood that the various spheres as indicated in Fig. 1 are not intended to be shown in exactly the same proportions and relative positions as they occur in nature, since that would be practically impossible in view of the tremendous distances between some of the planets as compared with others and the great size of certain heavenly bodies as compared with bodies such as Mercury and the Moon. However, with the arrangement as shown, the relative spacings and sizes of the spheres may readily be made such as to give the student or observer a general understanding of the relationship of the main bodies of the solar system.

Referring now to Fig. 2, the mechanism for supporting and operating each of the moving bodies will be described in further detail. The entire apparatus may be mounted upon a suitable rigid base member as at 25 carrying a shaft 26 provided with a manually operable crank 27. Alternatively, the shaft 26 may be turned by an electric motor 28 mounted within the base 25. The motor 28 may be provided with suitable reducing gearing as at 29, the latter being connected to the shaft 26 through a pair of longitudinally separable gear members as at 30. When the motor is to be used to operate the device, a gear 31 on shaft 26 may be brought into engagement as shown, with a gear 32 mounted on a vertically extending shaft 33. The upper end of shaft 33 may be provided with a small pinion gear 34 engaging a larger gear 35 which in turn may be fixed to the rotatable housing 22.

If instead of operating the apparatus by the motor 28, it is desired to manually operate the same, then the shaft 26 may be pulled longitudinally to the right as viewed in Fig. 2, so that the gear connections at 30, 31 and 32 will become disconnected, and instead a gear 36 on the shaft 26 will come into engagement with a gear 37 mounted on a vertically extending shaft 38. The upper end of the shaft 38 may be provided with a small pinion gear 39 for engaging with and turning the larger gear 35. If desired, as the shaft 26 is moved to the right for manual operation, it may be so interconnected with an electrical switch as at 40 adapted to cut off the supply of current to the motor 28. And when the shaft 26 is restored to its former position, the switch 40 will be operated to connect the motor circuit. A spring pressed detent member as at 41 may be affixed to the base and adapted to engage suitable circular depressions in the shaft 26 as shown, to retain the shaft either in position for manual operation or for operation by the motor.

Within the shaft 12 to which the globe 10 representing the Sun is secured, there may be provided a rigid central shaft 42 fixed against rotation within the base 25. This shaft if desired may be hollow so as to provide space for electrical connections as at 43 for conducting current to a lamp 44 within the globe 10. The lamp 44 may be fixed on the top of the shaft 42 and serves to illuminate the globe 10.

As above stated, the sphere 20 representing the Earth is mounted upon the rotatable housing 22. The housing 22 is rotated about the central shaft 42 at a suitable speed for demonstrating the motion of the Earth in following its orbit around the Sun. That is, the housing 22 is rotated by reason of the pinion gears 34 or 39 which engage the gear 35 affixed to the under side of the rotatable housing as by the rivets 45.

The motions of all the other bodies illustrated are also caused directly or indirectly by reason of the rotation of the housing 22 in the direction of the arrow in Fig. 3. For this purpose the housing 22 may be provided with a pair of counter shafts as at 46 and 47 driven respectively by interengaging pinion gears 48 and 49, the gear 49 also engaging a larger gear 50 fixed to the central shaft 42 so that as the housing rotates, the pinions 48 and 49 are forced to rotate and turn the counter shafts 46 and 47 at desired speeds.

A hollow shaft 51 may be provided surrounding the fixed shaft 42, for carrying a lens system 52 adjacent the lamp 44. That is, the lens system 52 may be mounted upon a bracket 53, which in turn has a horizontally adjustable rack and pinion connection at 54 with the upper end of the shaft 51. The lens system 52 may be of any suitable well understood type adapted to focus a spot of light from the lamp 44 onto the "Earth" to indicate the "noon ray" of the Sun on the Earth. This will demonstrate the apparent motion of the noon Sun, north and south of the Equator during the changes of seasons, or from day to day. This feature is especially useful in connection with the explanation of the shifting of the planetary wind belts. Also if desired, by adjusting the rack and pinion support 54 for the lens system 52, the lenses may be so positioned as to cause an enlarged beam of light from the lamp 44 to so shine on the "Earth" as to indicate the extent of the "daylight circle" on "Earth". This effect may also be obtained by enlarging the source of light. This will demonstrate the shifting of the "daylight circle" with changes of seasons, or from day to day. In order to have either the "noon ray" or the light from the "Sun" for demonstrating the "daylight circle" properly follow the movement of the "Earth" along its orbit, the lens system 52 is arranged to turn around the lamp 44 with the same speed of revolution as the "Earth". This is accomplished by reason of the rotation of the shaft 51 upon which the lens system is mounted, the shaft being fixed to the frame within the housing. That is, the lower end of the shaft 51 may be formed with an arm 55 embracing at its outer end the shaft 47, so that the arm 55 and shaft 51 are caused to rotate with the housing 22 within which shaft 47 is mounted. Thus the lenses at 52, and the housing 22 together with the "Earth", will revolve about the lamp 44, all at the same speed.

For mechanical simplicity, common means are provided for causing "Mercury" to revolve about the "Sun" and for causing the "Sun", globe 10, to rotate on its axis, although of course these rotations are not at the same speed in nature. This common means may comprise a hollow shaft 56 encircling the shaft 51, and provided at its lower end with a sprocket or gear 57 connected to or engaging a sprocket or gear 58 affixed to shaft 47. Thus turning of the shaft 47 causes rotational movement of a suitable speed to be applied to shaft 56. At its upper end the shaft 56 may be secured within the above mentioned rotatable shaft 12 for applying the rotational movement to the latter and thereby causing the globe 10 representing the Sun to rotate. At its lower end the shaft 12 may be formed with a pair of apertures as at 60a and 60b adapted respectively to receive somewhat flexible projections as at 61a and 61b formed on a yieldable yoke member 62. The yoke member 62 is attached to and serves to support the wire member 15 for carrying "Mercury". The wire support 15 is thus free for up and down pivotal movement about the projections 61a and 61b. This is for the purpose of permitting "Mercury" to be moved up and down in respect to the plane of the ecliptic during the movement of "Mercury" along its orbit about the "Sun". Such up and down movement may be effected by a cup-shaped cam member 63 having an inclined upper surface, as shown, for engaging the wire support 15 near its lower end, so that as the wire support is rotated about the central shaft, it will ride up and down along the upper edge of cam 63. This will cause "Mercury" to follow an orbit approximately within a plane positioned at an angle to the plane of the ecliptic, so as to demonstrate that Mercury in nature follows such an orbit.

The yoke member 62 is made flexible and hence removable, as are also similar members for the other planets hereinafter described, so that one or more of the planet bodies may be conveniently removed in case it is desired to concentrate attention on the "Earth", "Moon" or remaining planets.

The action of the cam 63 on the supporting wire 15 also will be such as to give "Mercury" a somewhat elliptical path in its travel around the "Sun", thereby demonstrating a similar condition in nature. That is, as the wire support 15 is moved up and down by the cam, the outer end of the support will also be moved radially to some extent. Since in nature, the orbit of Mercury has a pronounced eccentricity, if desired in order better to demonstrate this fact, the support 15 may be equipped with mechanism of the type indicated in Figs. 4 and 5 hereinafter described, to more effectively or accurately provide such great eccentricity.

In order to demonstrate the regression of the nodes of Mercury's orbit, the cam 63 may also be rotated. For this purpose it may be mounted upon a rotatable shaft 64. For simplicity of mechanism the rotatable shaft 64 may also carry a flexible and removable yoke member 65 for rotatably supporting the wire or rod 17 carrying "Venus". The wire support 17 in turn may be given an up and down movement during the rotation of "Venus" by a cam 66 mounted upon a rotatable shaft 67. The shaft 67 also may be provided with a detachable yoke member 68 similar to the yokes 65 and 62 above described, but for carrying the wire or rod support 19 for "Mars". The wire 19 is adapted to be given an up and down movement by a rotatable cam 69 similar to the cams 66 and 63 above described. Cam 69 may be fixed to a rotatable shaft 70 which may also be arranged to carry a wire or rod support 24 for "Jupiter".

The various parts for rotating the cams and supports controlling the motions of "Venus", "Mars" and "Jupiter" may be generally similar to those for "Mercury" and will now be described in further detail. Cam 63 and rotatable shaft 64 may be secured to rotate with a shaft 71 having at its lower end a sprocket 72 connected by a chain 73 to a sprocket 74 mounted on shaft 47. Cam 66 and rotatable shaft 67 may be secured to rotate with a shaft 75 having at its lower end a sprocket 76 connected to a chain with a sprocket 77 fixed to shaft 46. Shaft 70 which carries cam 69 and the support 24 for "Jupiter", may be provided at its lower end with a sprocket 78 connected by a chain to a sprocket 79 fixed on shaft 46.

The various sprockets and gears above described should of course be so proportioned as to give the various bodies representing the solar system, relative speeds of rotation or other movement comparable, as closely as is practically possible, to the relative speeds in nature. However, some of the smaller variations of movement occurring in nature may readily be exaggerated for clearness of demonstration with the above described apparatus.

If it is desired to demonstrate additional planets or other heavenly bodies, further cams such as at 63, 66 and 69, and additional yoke supports such as 62, 65 and 68 may be provided around the central fixed shaft, and beneath those illustrated in Fig. 2. Of course, the support 24 for "Jupiter" might also be provided with means to give "Jupiter" an eccentric orbit as well as a precessional movement to the plane of its orbit if desired.

It will be noted that the shaft which rotates each planet also serves the further function of rotating a cam for giving an adjacent planet a regressional movement of the nodes of its orbit. For example, rotating shaft 75 serves as a common means for rotating "Mars" as well as for rotating cam 66 to provide the regressional movement for "Venus". While in nature the rotation of each planet is at a speed different from the rate of regression of the adjacent planet, yet the use of each of the rotating shafts as shown for a double purpose, considerably simplifies the apparatus and renders it more portable and compact. Without this feature at least twice as many sprockets and shafts would be required. Although this use of each shaft for a double purpose involves the sacrifice of causing a regression of the nodes of the planetary orbits eastward instead of westward, it still permits, however, the general regression effects to be demonstrated.

In order that the student may be familiarized in greater detail with the movements of the Earth and the Moon, the spheres representing these bodies are mounted separately at the outer end of the rotatable housing 22. The "Earth" may be mounted to rotate about a shaft 80 comparable to the axis of the Earth and having at its lower end a sprocket or pinion 81 driven by a sprocket or gear 82. The shaft 80 may be mounted within a bracket 83 fixed to a shaft 84, which in turn may be rotatably mounted as at 85 within the outer end of the housing 22. The shaft 85 may have affixed thereto a sprocket 86 connected by a chain 87 with a sprocket 88. The sprocket 88 in turn may be fixed against rotation by being secured to the fixed shaft 42. Thus when the arm or housing 22 rotates about the base of the device, the sprocket 86 together with shaft 85 will be forced to rotate while the sprocket chain 87 unwraps itself from one side of the sprocket 88 and wraps itself upon the other side thereof. Thus rotation of shaft 85 will cause bracket 83 to rotate, with the result that the poles of the "Earth" will be variably tilted in respect to the "Sun" to demonstrate the cause of the seasons of the year on "Earth", while maintaining substantial parallelism of the "Earth's" axis during its forward motion in space. At the same time rotation of the bracket 83 will cause sprocket 81 to be rotated by sprocket 82, thereby giving the "Earth" rotation about its axis and also illustrating, in connection with the light from lens system 52 the "day" and "night" conditions of illumination of the "Earth" at different seasons of the year. The sprocket 82 may be fixed to a shaft 90, which in turn may be fixed at its lower end to bracket 91 within the rotatable housing 22.

Precession of the equinoxes is demonstrated without appreciably altering the parallelism of the "Earth's" axis, by a slight difference in the number of teeth on sprockets 86 and 88. For example, if sprocket 88 has 21 teeth and sprocket 86 has 20 teeth, the "Earth's" axis will shift 5% in a westward direction away from true parallelism during each revolution around the "Sun". This is exceedingly slight and therefore the phenomena that accompany changes of seasons are observed as though the axis were really parallel at all times. However, in 20 revolutions, which may be planned to take place in 20 minutes, the period of precession will be completed and the axis of the "Earth" will again point to the same constellation as before. Thus the phenomena which cause the "Platonic Year" or "Great Year" once every 26,000 years in nature, may be readily demonstrated to the student in a short period.

The "Moon" may be supported by a wire or rod 92 mounted in a manner somewhat similar to the mounting of the wire supports above described for the "planets". This is, the lower end of wire 92 may be formed with a yieldable yoke member 93 for detachable and pivotal engagement with a rotatable sleeve 94 fixed to a shaft 95. The shaft 95 may be provided at its lower end with a sprocket 96 rotated by a chain 97 connected to a sprocket 98 on shaft 47.

Thus rotation of shaft 47 will serve to rotate through the sprocket connections, the shaft 95 which in turn serves to carry the support for the "Moon" in a rotational movement for illustrating the orbit of the "Moon" about the "Earth", while at the same time the "Moon" and "Earth" pass around the "Sun". The support 92 for the "Moon" may be given an up and down motion as it passes around the "Earth" by engagement with the upper surface of a cup-shaped cam 100 operating in a manner similar to the cam 63, 66 and 69 above described in connection with the "planets". The cam member 100 may be secured to a rotatable shaft 101 provided at its lower end with a sprocket 102 connected by chain 103 to a sprocket 104 fixed to the fixed shaft 42.

A slight difference in the number of teeth on sprockets 102 and 104 may be made to result in the regression of the nodes of the "Moon's" orbit in a westward direction. For example, if sprocket 104 has 21 teeth and sprocket 102 has 20 teeth, this precessional period will be completed in 20 revolutions of the "Earth" about the "Sun", or in a period representing 20 years. In nature this actually occurs in about 19 years. This motion partly accounts for the number and variety of eclipses during the year.

If it is desired to illustrate the scope of the "daylight circle" on the "Earth" without illumination of the lamp 44, then the portion of the sphere 20 opposite from the "Sun" may be covered with a hemisphere of sheet metal as at 110 supported by a bracket as at 111, which bracket in turn may be fixed to the under side of the gear 82 as at 112. This form of mounting for the shield 110 avoids interference with the "Moon's" orbit. The hemisphere 110 should of course be of a suitable radius so that it may be mounted slightly in spaced relationship to the surface of the "Earth".

If it is desired to indicate the position of the "noon ray" on the "Earth" also without illumination of the lamp 44, this may be done as by a mechanical pointer 113 mounted upon a pin 114 affixed to the housing 22, but slidably removable therefrom to enable the "planet" supporting rods to rotate without interference.

As indicated, each of the sprocket wheels mounted upon or surrounding the shaft 42, as well as those surrounding shaft 85, may have their adjacent surfaces separated if desired by ball bearings to facilitate easy, smooth rotation of the sprockets and various parts connected therewith.

The portion of the casing 22 which extends out as a support for the "Earth" and "Moon" may if necessary be counterbalanced by placing suitable weights on the portion of the casing to the left of shaft 42 as viewed in Figs. 2 and 3. The casing may be cast or formed of pressed sheet metal with a removable bottom plate if desired, as indicated at 115 (Fig. 2) attached by screws as shown in Fig. 3. It will be noted that the casing 22 with its channel-shaped rotating arm, not only functions as a support for most of the operating parts, but also as a convenient cover for the gears, sprockets and chains, effectively concealing these parts from the attention of the observer and giving the equipment a more realistic and compact appearance.

As shown in Figs. 4 and 5, an alternative arrangement may be provided for supporting any one or more of the rods to which is attached a "planet" or the "Moon". This arrangement is adapted to give the orbit of the body controlled thereby a pronounced eccentric shape, with the eccentricity varying with each succeeding cycle of movement of the body around the "Sun", or around the "Earth" in case the body is the "Moon". That is, with this arrangement the orbit of a "planet" or of the "Moon" may be given a recurring series of perturbations. In the particular example shown, provision is made for a series of four perturbations corresponding respectively to the series of four irregular edge sections $a$, $b$, $c$ and $d$ of a cam 116 affixed to a gear as at 117. The gear 117 in the example shown, rotates four times with each rotation of a gear 118 mounted upon a rotatable vertical shaft 119. The gear 116 may be rotatably mounted upon a yoke member as at 120 having projecting ends as at 121 and 122 pivotally engaging apertures as in a rotatable hollow shaft 123. A supporting member for a "planet" or the "Moon" or if desired some member indirectly connected (as hereinafter described) to a "planet" or the "Moon", is indicated at 124. This member is slidably retained on the yoke member 120 as by channel-shaped clips 125. The lower end of the member 124 may be provided with a small roller 126 for engaging the edge of cam 116, contact with the cam being assured by a retaining spring 126a in a manner which will be apparent from inspection of Fig. 5. The member 120 may be rotated if desired in a horizontal plane by reason of the engagement of the yoke projections 121, 122 with the shaft 123. On the other hand, if desired, the member 120 may be caused to also rise and fall during its rotation by engagement with the upper edge of a cup-shaped cam member as at 127. This will permit demonstration of the inclination of the orbit of the Moon or planet in respect to the ecliptic, while also showing eccentricity of the orbit. The cam 127 may be mounted on an independent rotatable shaft, as is the case with cams 63, 66 and 69, or cam 127 may be mounted directly on shaft 123, which carries the adjacent yoke member 120.

Thus with the arrangement of Figs. 4 and 5, for example, if the cam 116 and gear 117 rotate once for each four revolutions of the gear 118, then a series of four different perturbations may be given to the orbit of the bodies supported or controlled by the rod 124. For example, a "planet" during four succeeding revolutions around the "Sun", might be given in succession four different elliptical movements, depending upon the shape of each of the sections $a$, $b$, $c$ and $d$ of cam 116. By changing the ratio of the gears 117, 118, and correspondingly altering the number of cam sections, of course, more or less than four perturbations may be provided in each recurring series. And the extent of each perturbation may be changed by altering the shape of each cam section.

Of course, if the yoke member 120 of Figs. 4 and 5 is rotated on a shaft at a speed different from that of the shaft carrying gear 118, the direct relationship of the number of perturbations to the number of cam sections such as a, b, c and d will not be maintained. However, even a greater variety of eccentricities may be secured. For example, consider the motion of the planet "Mercury", if the arrangement of Figs. 4 and 5 were substituted for that above described for "Mercury" in connection with Fig. 2. Then if the ratio of gears 118 to 117 is as one to two, and if for example, the gear 118 turns through 42% of a revolution for each complete revolution of the yoke 120, the cam 116 will then turn on its own axis through 21% of one revolution or approximately 72°. Hence, this will allow a maximum of five different eccentricities in five successive revolutions of the planet. The maximum number of eccentricities may be reduced without altering the gear ratio simply by repeating the design of various sections of cam 116 at various places along the cam circumference.

With the arrangement of Figs. 4 and 5, in some cases it may not be desired to attach the "planet" or "Moon" directly to the wire support 124. Instead, the member 124 may be provided with an extension as at 124a (Fig. 5) pivotally connected as shown to the members 124 and 120. This arrangement is such that a slight motion from the cam 116 may be multiplied a great many times at the elevation of the planet or satellite. Thus the eccentricity of a planet may be sufficiently exaggerated to give a clearer demonstration.

The variable eccentricities of the "Moon" which may be demonstrated by the use of the apparatus of Figs. 4 and 5 are a second factor which contributes to the number and variety of eclipses from year to year. Also where this arrangement is used in connection with planets, it will aid in demonstrating in general the relative positions of the planets and the occurrence of transits.

Fig. 6 illustrates a modified form of arrangement for giving a body such as the "Moon" for example, a compound up and down movement, i. e., an arrangement such that for example the "Moon" in its orbit may be given perturbations above and below the plane of the ecliptic by the use of a cam 130 engaging the rod 131 supporting the "Moon" and these perturbations may be further modified by reason of the engagement of the lower surface of a rotatable cam 132 with the rod 131 during its rotation. The mechanism for moving the cams 130 and 131 may be similar in many respects to that shown at the righthand end of Fig. 2, corresponding parts being identified by the same reference numerals. However, the cam 132 may be secured to a rotatable shaft 133, to the lower end of which is affixed a sprocket 134 connected by a chain to a suitable sprocket on one of the shafts 46 or 47, so as to impart to cam 132 the desired rotational speed. A yoke member 135 secured to the end of the rod or wire 131 may have its end projections free to move up and down somewhat within slots as at 136 and 137, formed in a sleeve 138. The sleeve 138 may be secured to a rotatable shaft 139, at the lower end of which is affixed a sprocket 140 connected by a chain to a suitable rotating sprocket within the lefthand portion of the apparatus of Fig. 2. The cam 130 may be secured to a rotatable shaft 141, to the lower end of which is secured a sprocket 142 also rotated by a chain connected to a suitable rotating part within the lefthand portion of the apparatus of Fig. 2. With this arrangement it will be apparent that as the yoke member 135 rotates and carries the "Moon" or other body around its orbit on support 131, this support will be variably moved up and down by reason of its engagement with the upper edge of cam 130 and the lower edge of cam 132, and thus, depending upon the relative speeds of the rotating sprockets, a wide variety of changes in the vertical position of the support during its rotation may be provided.

It is apparent that the above described apparatus is not only well adapted for giving a dynamic conception of the solar system with the simultaneous motions of rotation and revolution of the principal bodies of the solar system, but also affords a relatively simple means for demonstrating most of the more important and complex variations of such motions.

While the invention has been described in detail with respect to particular preferred examples, it will be understood by those skilled in the art after understanding the invention, that various changes and further modifications may be made without departing from the spirit and scope of the invention, and it is intended therefore in the appended claims to cover all such changes and modifications.

What is claimed as new and desired to be secured by Letters Patent is:

1. In a planetarium, a source of light representative of light from the Sun, a rotatable light transmitting globe surrounding said source to represent the Sun's surface, a sphere representing a body in the solar system, means for rotating said globe and for causing said sphere to revolve around said globe with a rotational speed different from that of said globe, and means revolving around said light within said globe, independently of the revolution of said globe, for projecting a beam of light from said source onto said sphere while the latter revolves around said globe.

2. In a planetarium, a sphere representing the Earth, means for rotating said sphere about its poles and for causing the same to advance along an orbit with a predetermined relationship between the rotational and orbital motions, and means for projecting onto the moving sphere a restricted beam of light maintained in a position corresponding to the "noon ray" of the Sun on the Earth.

3. In a planetarium, a sphere representing the Earth, means for rotating said sphere about its poles and for causing the same to advance along an orbit with a predetermined relationship between the rotational and orbital motions, a light transmitting globe with a lamp therein, representing the Sun and for illuminating the planetarium, and means within said globe for projecting onto the moving sphere a beam of light maintained in such position as to demonstrate the scope of the "daylight circle" on the Earth during its rotation about its poles and during its simultaneous advance along its orbit.

4. In a planetarium, a sphere representing the Earth, means for imparting to said sphere rotational movement about its poles and also for advancing said sphere along an orbit, a body representing the Moon, means for imparting to said body a motion representative of the movement of the Moon around the Earth, at a predetermined speed of revolution different from the speed of revolution of the sphere around its poles, and means for projecting a moving restricted beam of light representative of the Sun's rays onto said moving sphere and body during their said motions, whereby the phenomena of different sequences of lunar eclipses may be demonstrated, as well as the sequences of solar eclipses and the paths thereof on said rotating and advancing sphere representing the Earth.

5. In a planetarium, a source of light representative of light from the Sun, a globe surrounding said source, the portions of said globe except for the supporting area being capable of transmitting light to represent the illuminated surface of the Sun, and means within said globe and rotatable around said source for projecting a more concentrated beam of light through said globe and onto a planetary body outside said globe.

6. In a planetarium, a sphere representing the Sun, a second sphere representing the Earth, means for imparting motion to said spheres representative of the relative rotational movements of the Sun and Earth in nature and of the orbit of the Earth, and means within said first named sphere rotatable at the same speed as the speed of rotation of said second named sphere around the first, for projecting a concentrated beam of light onto said second named sphere, said projecting means being adjustable for projecting onto said second named sphere a spot of light representative of the "noon ray" of the Sun, or alternatively an area of concentrated light for demonstrating the extent of the "daylight circle".

7. In a planetarium, a body representing a planet or satellite, means for supporting said body and for carrying the same along an orbit about an axis, means for causing said support to rise and fall during its movement to illustrate changes of the position of the body in respect to the plane of the ecliptic, and means for at the same time imparting eccentricity to the orbital motion of the body independently of said rising and falling movements.

8. In a planetarium, a body representing a planet or satellite, means for supporting said body while imparting thereto an orbital motion, means for causing said support to rise and fall during its orbital motion to represent changes of the position of the body in respect to the plane of the ecliptic, and additional means for independently imparting predetermined perturbations to the rising and falling movement of said support.

9. In a planetarium, a body respresenting a planet or satellite, means for supporting said body and for carrying the same along an orbit about an axis, means for causing said support to rise and fall during its movement to illustrate changes of the position of the body in respect to the plane of the ecliptic, and means for at the same time imparting a recurring series of eccentricities to the orbital movement of the body during intervals of predetermined length in respect to the time of each complete orbital movement of the body.

10. In a planetarium, a body representing a planet or satellite, means for supporting said body and advancing the same along its orbit, and means for simultaneously imparting to such orbital movement of the body a recurring series of variations in the degree of eccentricity of the orbital motion.

11. In a planetarium, a body representative of a planet or satellite, means for supporting and at the same time advancing said body along its orbit, a member rotatable about a fixed axis for carrying said supporting means, another member rotatable about said axis for imparting up and down motion to said support for indicating variations in the position of said body in respect to the plane of the ecliptic, another body representative of a planet or satellite, means for supporting said other body while advancing it along its orbit, said last named supporting means being attached to and rotated by said other rotatable member.

BENJAMIN A. LA GRASSE.